(12) United States Patent
Rosada et al.

(10) Patent No.: US 7,850,143 B1
(45) Date of Patent: Dec. 14, 2010

(54) BALL VALVE ASSEMBLY

(75) Inventors: Alesandro Rosada, Toronto (CA);
Thomas M. Gosling, Kitchener (CA);
Ronald J. McNeil, Oakville (CA)

(73) Assignee: Ggosco Engineering Inc., Oakville, Ontario (CA)

( * ) Notice: Subject to any disclaimer, the term of this patent is extended or adjusted under 35 U.S.C. 154(b) by 336 days.

(21) Appl. No.: 12/100,743

(22) Filed: Apr. 10, 2008

(51) Int. Cl.
*F16K 5/06* (2006.01)

(52) U.S. Cl. .................. 251/316; 251/121; 251/315.01; 251/359

(58) Field of Classification Search .................. 251/118, 251/120, 121, 126, 127, 315.01, 315.07, 251/314, 316, 317, 317.01, 359, 360
See application file for complete search history.

(56) References Cited

U.S. PATENT DOCUMENTS

| | | | |
|---|---|---|---|
| 3,462,120 A | 8/1969 | Priese | |
| 3,467,176 A * | 9/1969 | Truhan | ......................... 165/97 |
| 3,497,178 A | 2/1970 | Priese | |
| 3,578,289 A | 5/1971 | Thevignot et al. | |
| 3,677,514 A | 7/1972 | Mencarelli | |
| 3,771,545 A | 11/1973 | Allen | |
| 3,904,326 A | 9/1975 | Clement | |
| 3,985,150 A | 10/1976 | Kindersley | |
| 4,027,853 A | 6/1977 | Linnert | |
| 4,079,468 A | 3/1978 | Liotta et al. | |
| 4,192,338 A | 3/1980 | Gerulis | |
| 4,258,900 A | 3/1981 | Kindersley | |
| 4,260,131 A | 4/1981 | Kindersley | |
| 4,342,330 A | 8/1982 | Wieveg et al. | |
| 4,399,977 A | 8/1983 | Wheatley | |
| 4,441,524 A | 4/1984 | Mese | |
| 4,524,946 A * | 6/1985 | Thompson | ................... 251/88 |
| 4,532,959 A | 8/1985 | Hartshorn et al. | |
| 4,627,464 A | 12/1986 | Hartshorn | |
| D297,254 S | 8/1988 | Odate et al. | |
| 4,793,589 A | 12/1988 | Eldredge et al. | |
| 4,800,046 A * | 1/1989 | Malek et al. | ................ 261/50.3 |
| 4,887,794 A | 12/1989 | Oliver et al. | |
| 4,890,643 A | 1/1990 | Oliver | |
| 4,911,409 A | 3/1990 | Oliver et al. | |
| 5,022,422 A | 6/1991 | di Palma | |
| 5,069,240 A * | 12/1991 | Kurkjian, Jr. | ............. 137/15.22 |
| 5,117,858 A * | 6/1992 | Osthues et al. | ......... 137/315.21 |
| 5,328,094 A | 7/1994 | Goetzke et al. | |
| 5,421,358 A | 6/1995 | Jaeger | |
| 5,799,928 A | 9/1998 | Siver | |
| 5,857,438 A | 1/1999 | Barnard | |
| D411,870 S | 7/1999 | Humber | |
| 5,927,685 A | 7/1999 | Gosling | |
| 5,927,687 A | 7/1999 | Krause | |
| 5,947,157 A | 9/1999 | Kindersley | |

(Continued)

*Primary Examiner*—John K Fristoe, Jr.

(57) ABSTRACT

A ball valve assembly for controlling flow of a mixture. The ball valve assembly includes a body with a cavity therein and a ball positioned in the cavity with a passage therethrough, and a low-pressure valve seat and a high-pressure valve seat for locating the ball therebetween. The ball is movable between an open position, in which flow of the mixture through the passage is permitted, and a closed position, in which flow of the mixture through the ball is substantially prevented. The low-pressure valve seat includes one or more scallops formed to permit movement of at least a portion of the solid particles past the low-pressure valve seat when the ball is in the open position.

13 Claims, 16 Drawing Sheets

U.S. PATENT DOCUMENTS

| | | |
|---|---|---|
| 6,199,824 B1 | 3/2001 | Lee |
| 6,835,449 B2 | 12/2004 | Kim et al. |
| 6,969,047 B2 | 11/2005 | Hotton et al. |
| 6,988,709 B2 | 1/2006 | Scaramucci |
| 7,093,819 B1 | 8/2006 | Hall et al. |
| 7,156,122 B2 | 1/2007 | Christenson et al. |
| 7,219,877 B1 | 5/2007 | Mogas et al. |
| 2002/0185625 A1 | 12/2002 | Gosling |
| 2003/0111631 A1 | 6/2003 | Gosling |
| 2007/0062589 A1 | 3/2007 | Christenson et al. |

\* cited by examiner

BALL VALVE ASSEMBLY

FIELD OF THE INVENTION

The present invention is related to an improved ball valve assembly for controlling a mixture's flow.

BACKGROUND OF THE INVENTION

Ball valves are widely used in various conditions for controlling the flow of mixtures. Such a mixture often includes small solid particles distributed in a fluid. In practice, in many mixtures, the solid particles are impurities. Alternatively, the mixture may be a media (e.g., a powder) and a (fluid) carrier therefor.

As is well known in the art, the ball may be held in place by valve seats, which are intended to permit the ball to move between open and closed positions. When the ball is in the open position, the mixture is permitted to flow through the ball. Often, the flow of the mixture through the ball is said to be from an upstream side to a downstream side, i.e., "upstream" and "downstream" typically refer to a direction of flow of the mixture through an open valve.

Controlling the flow of the mixture typically involves resisting pressure (i.e., a pressure differential) when the valve is closed. In practice, in many situations, when the ball is in the closed position, the mixture is subjected to pressure. Accordingly, when the ball is in the closed position, the valve is required to withstand pressure when the valve is closed. Such pressure may be directed in the downstream direction. Alternatively, such pressure may be directed in the upstream direction, depending on the circumstances.

In each ball valve, of necessity, gaps or apertures exist between the ball and the valve seats. Where (whether intentionally or otherwise) solid particles are included in the mixture controlled by the valve, the solid particles tend to accumulate in the gaps behind one or both of the valve seats (i.e., between the valve seats and the ball). In the prior art, the solid particles ultimately accumulate to the extent that the ball cannot be moved, at which point the valve is no longer functional.

Also, biasing means may be included in the prior art ball valve assemblies, e.g., for urging a valve seat against the ball. Typically, where a biasing means (e.g., a Belleville spring) is used, gaps are defined between the biasing means and the valve seat with which the biasing means is engaged, and solid particles tend to accumulate between the biasing means and the valve seat. Ultimately, sufficient particles accumulate to interfere with the biasing means' pressure on the valve seat.

Various attempts have been made in the prior art to address the problem of solid particles getting into the gaps between the valve seats and the ball. In general, these attempts usually involve seals intended to prevent the solid particles from getting into the gaps between the ball and the valve seats. Typically, the seals are positioned on the outer edges (i.e., between the valve seats' outer edges and the body) and on the inner side (i.e., the sides engaging the ball) of the valve seats respectively. However, these attempts to address the problem have some disadvantages. Since the seals must be dynamic (i.e., any such seal must accommodate the movement of the ball relative to the seal), any such seal eventually allows the solid particles to get into the gaps. In general, the seals tend to loosen somewhat with longer service. Also, once solid particles get between the ball and the seats, they tend to be trapped there by the seals. In this way, seals may exacerbate the problem.

SUMMARY OF THE INVENTION

In view of the problems in the prior art described above, there is a need for an improved ball valve.

In its broad aspect, the invention provides a valve seat which allows free flow of solid particles into the gaps between the valve seat and the ball, and also permits movement of the solid particles out of such gaps.

In one of its aspects, the invention provides a ball valve assembly for controlling flow of a mixture. The ball valve assembly includes a body with a cavity therein, and a ball positioned in the cavity. The ball includes a passage therethrough. The ball valve assembly also includes a low-pressure valve seat and a high-pressure valve seat positioned for locating the ball therebetween. The ball is movable between an open position, in which flow of the mixture through the passage is permitted, and a closed position, in which flow of the mixture through the passage is substantially prevented. The low-pressure valve seat includes one or more scallops formed to permit movement of at least a portion of the mixture past the low-pressure valve seat when the ball is in the open position.

In another aspect, the body includes one or more engagement surfaces proximal to the cavity. The low-pressure valve seat includes an inner side adapted for engagement with the ball and an outer side positioned opposite to the inner side. The low-pressure valve seat is at least partially engageable with the engagement surface to locate the low-pressure valve seat in a first predetermined position relative to the cavity. The high-pressure valve seat also includes an inner side adapted for engagement with the ball and an outer side positioned opposite to the inner side. The high-pressure valve seat is at least partially engageable with the engagement surface to locate the high-pressure valve seat in a second predetermined position relative to the cavity. The high-pressure valve seat is adapted to withstand pressure to which the mixture is subjected when the ball is in the closed position. In addition, the low-pressure valve seat includes an edge portion adapted for at least partial engagement with the engagement surface of the body, for locating the low-pressure valve seat in the first predetermined position.

In another aspect, the ball valve assembly includes a biasing means for urging the low-pressure valve seat to engage the ball.

In yet another aspect, the invention provides a low-pressure valve seat for use in a ball valve assembly for controlling a flow of a mixture. The low-pressure valve seat includes an inner side engageable with the ball positioned in the cavity, and an outer side positioned opposite to the inner side. The valve seat also includes an opening with which the passage in the ball is at least partially alignable, to permit flow of the mixture through the opening, and an edge portion adapted for at least partial engagement thereof with the engagement surface of the body, to locate the low-pressure valve seat in a predetermined position relative to the ball. The low-pressure valve seat includes one or more scallops formed to permit movement of the mixture past the low-pressure valve seat when the mixture is flowing through the ball.

In another aspect, each scallop includes a first channel wall positioned in the edge portion to define an aperture between the first channel wall and the engagement surface, the aperture being adapted to permit movement of the mixture therethrough.

In another of its aspects, each first channel wall is at least partially defined by a first longitudinal axis disposed substantially parallel to a flow direction of the mixture.

In yet another aspect, each scallop additionally includes a second channel in the outer side, the second channel being at least partially aligned with the first channel wall.

BRIEF DESCRIPTION OF THE DRAWINGS

The invention will be better understood with reference to the attached drawings, in which.

DETAILED DESCRIPTION

Figure 1A:
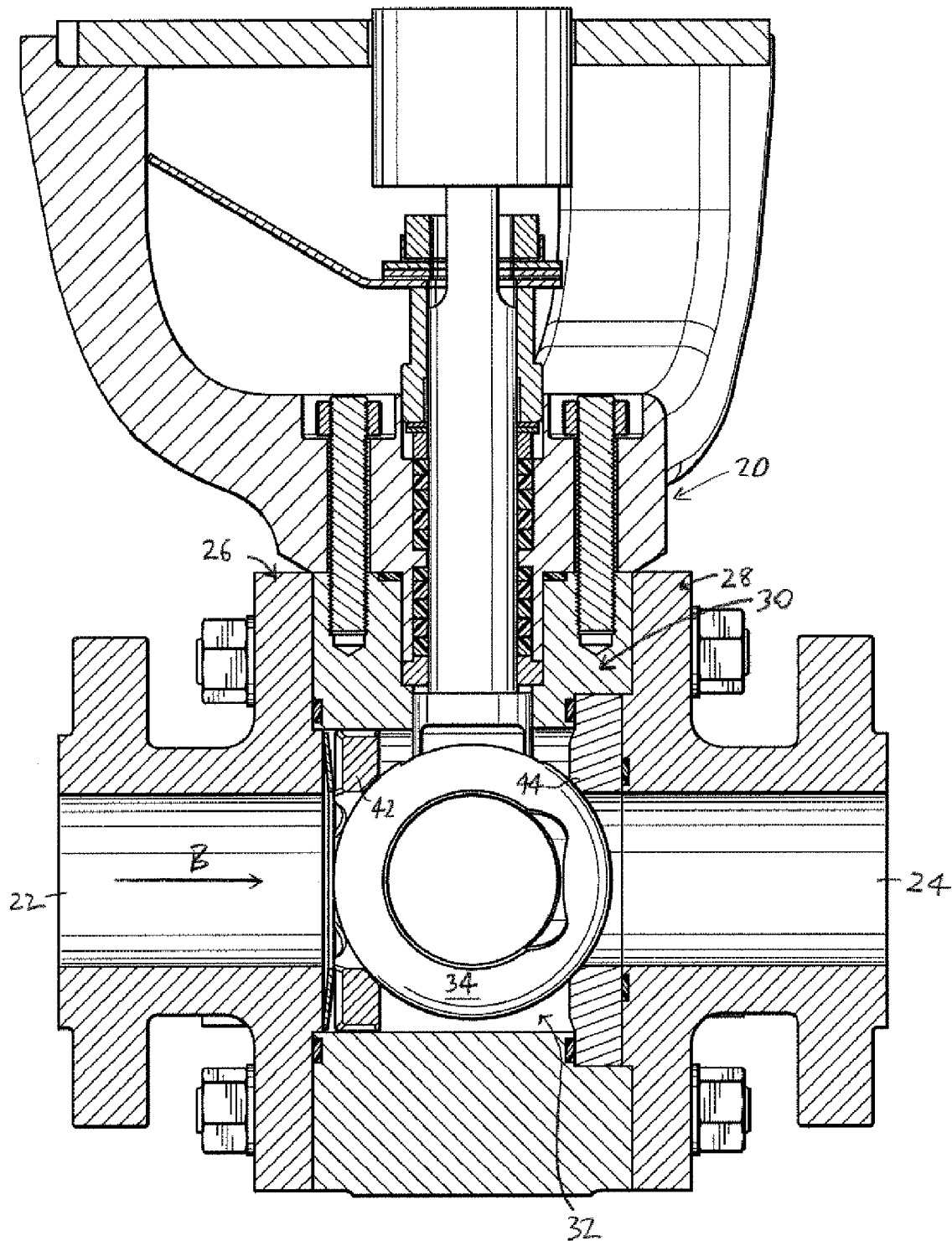
FIG. 1A is a cross-section of an embodiment of a ball valve assembly of the invention, including a body thereof, in which a ball in a cavity of the body is in a closed position.
Figure 1B:
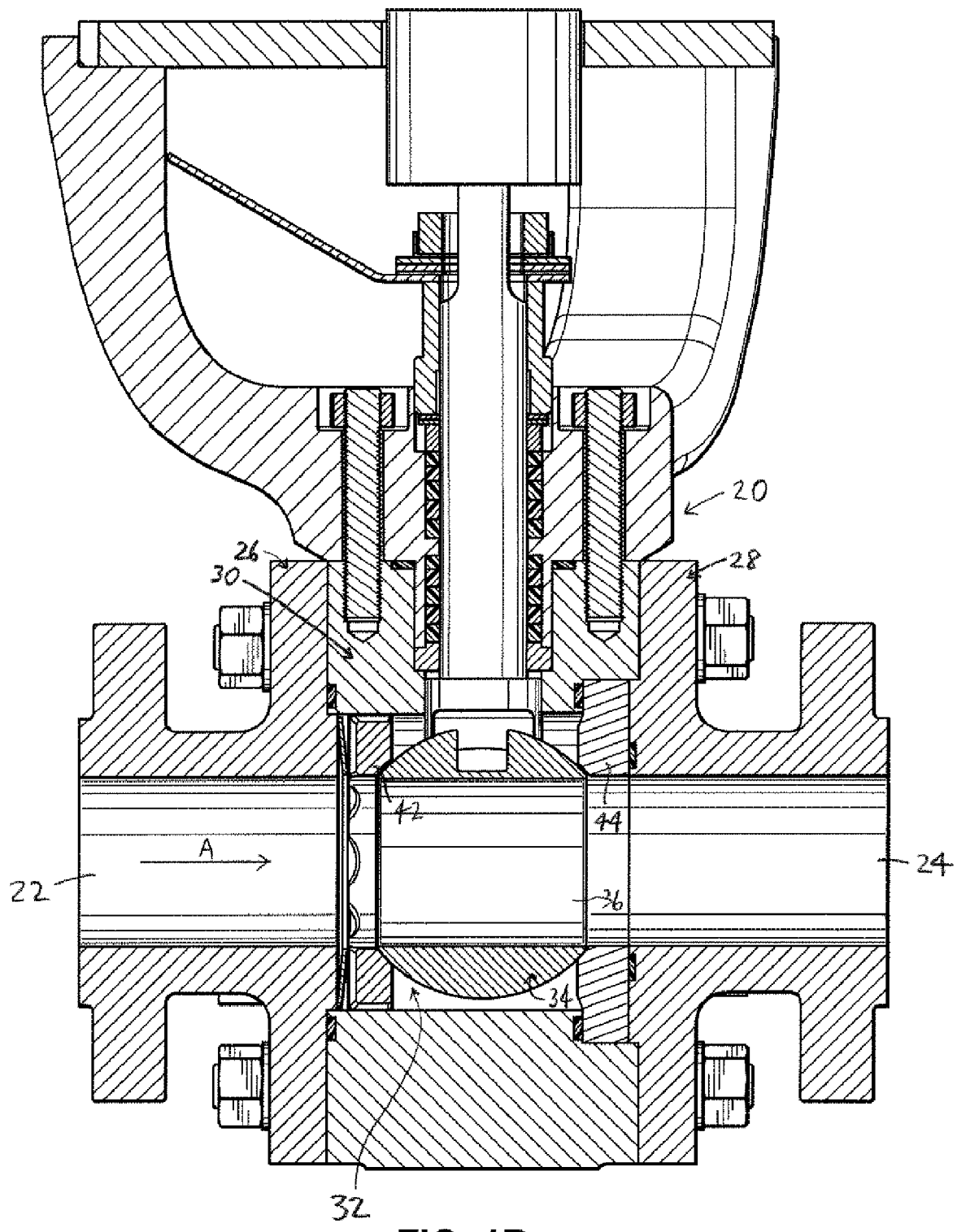
FIG. 1B is the ball valve assembly of FIG. 1A in which the ball is in an open position.
Figure 1D:
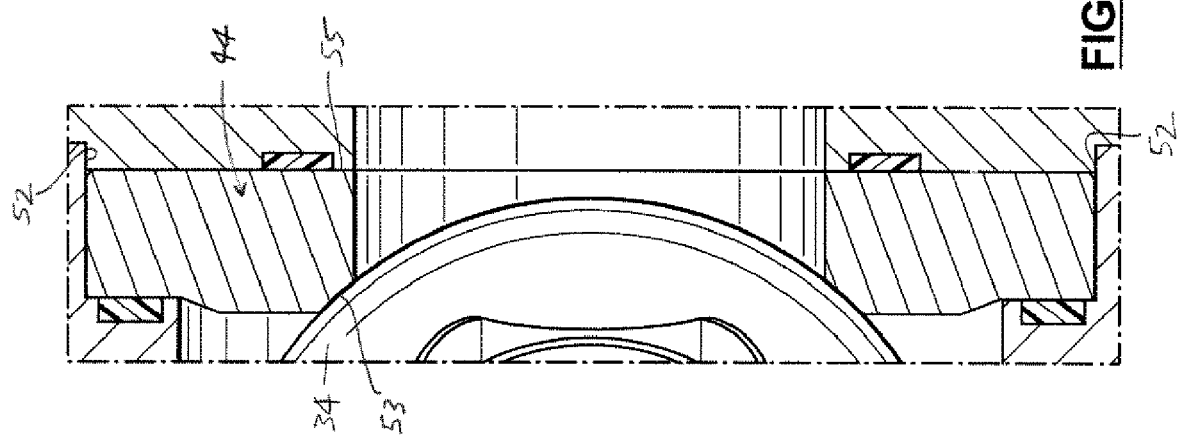
FIG. 1D is a cross-section of an embodiment of a high-pressure valve seat of the invention.
Figure 1C:
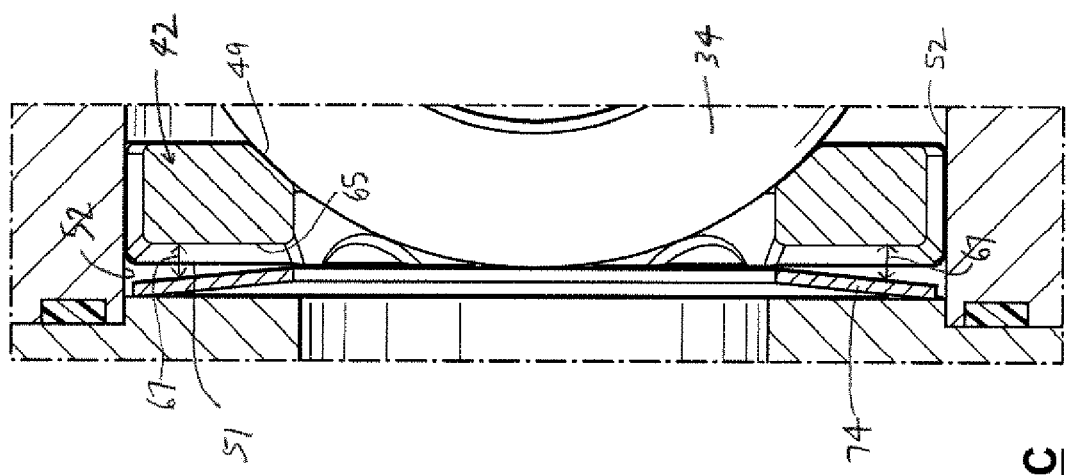
FIG. 1C is a cross-section of an embodiment of a low-pressure valve seat of the invention, drawn at a larger scale.
Figure 2A:
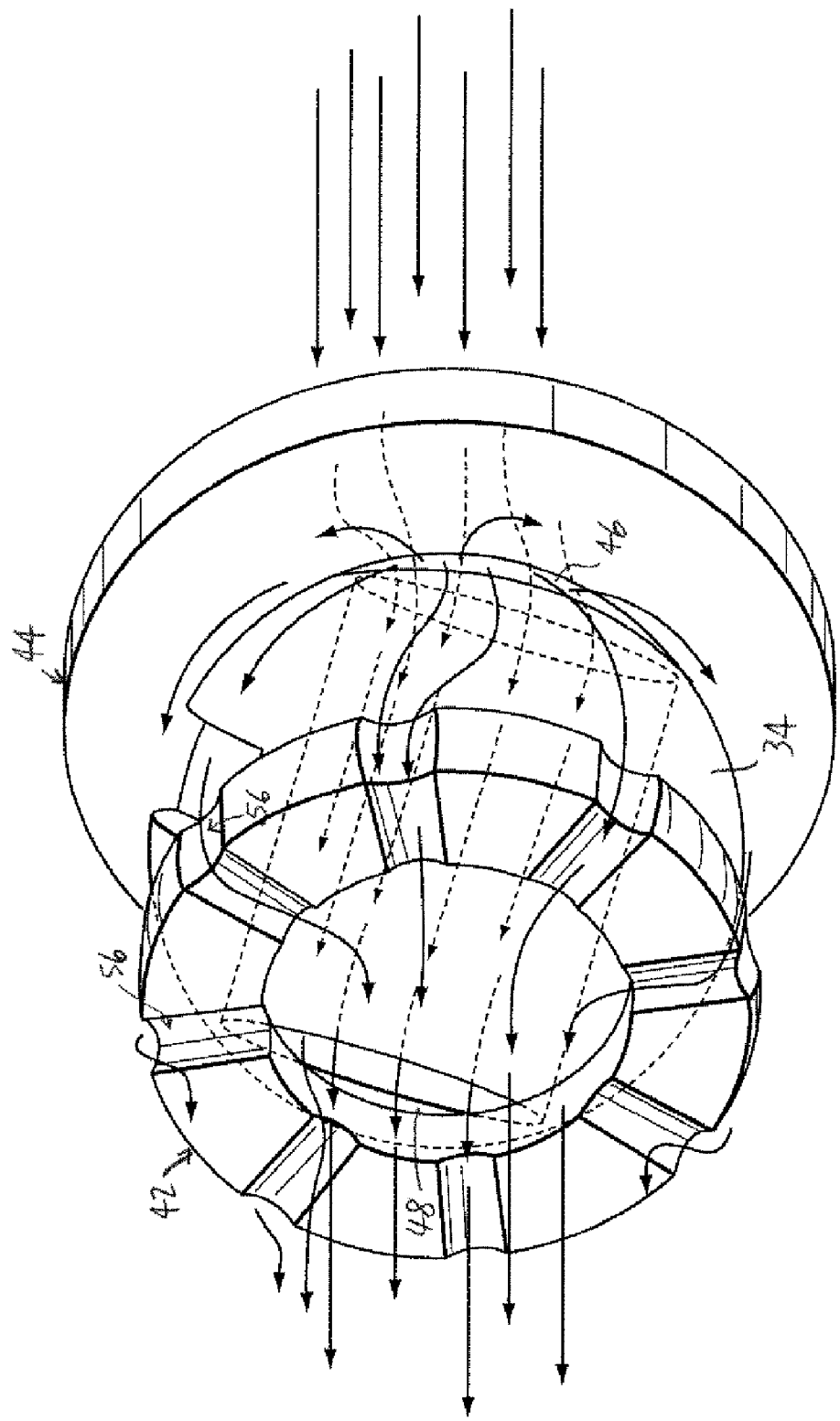
FIG. 2A is a schematic illustration showing the flow of a mixture through the ball valve assembly of FIGS. 1A and 1B when the ball is in an open position, drawn at a smaller scale.
Figure 2B:
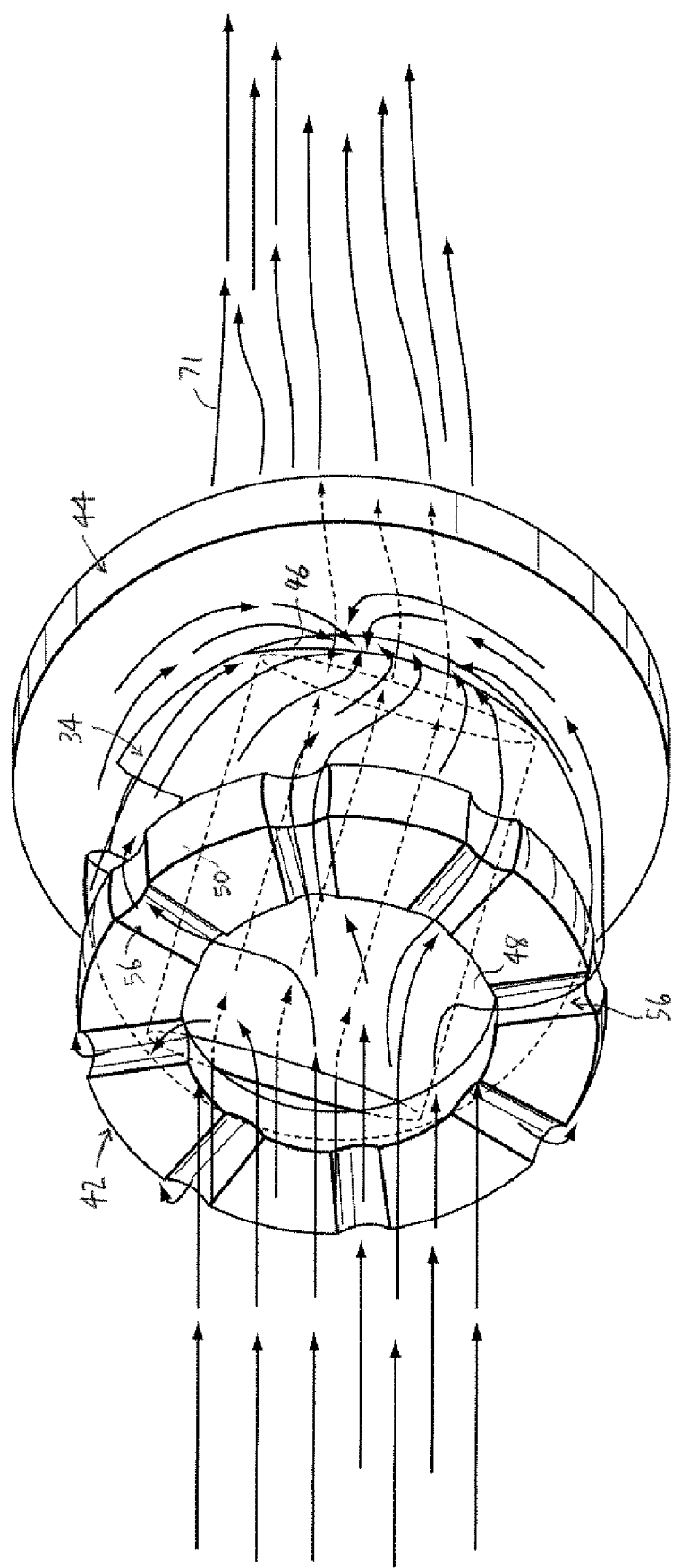
FIG. 2B is another schematic illustration showing the flow of a mixture in an opposite direction to that shown in FIG. 2A.
Figure 3:
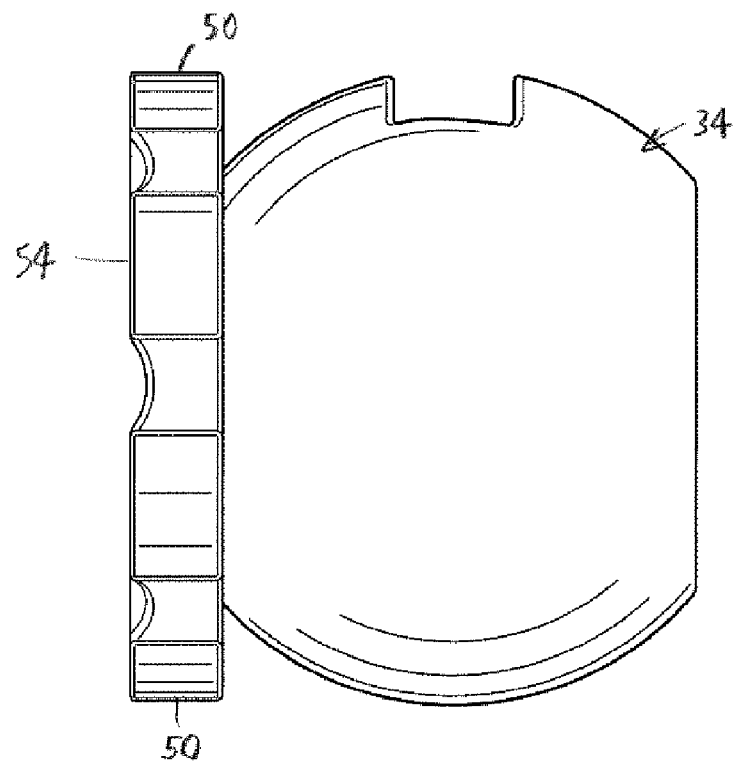
FIG. 3 is a side view of the ball and the low-pressure valve seat of FIGS. 1A, 1B and 1C engaged with the ball, drawn at a larger scale.
Figure 4:
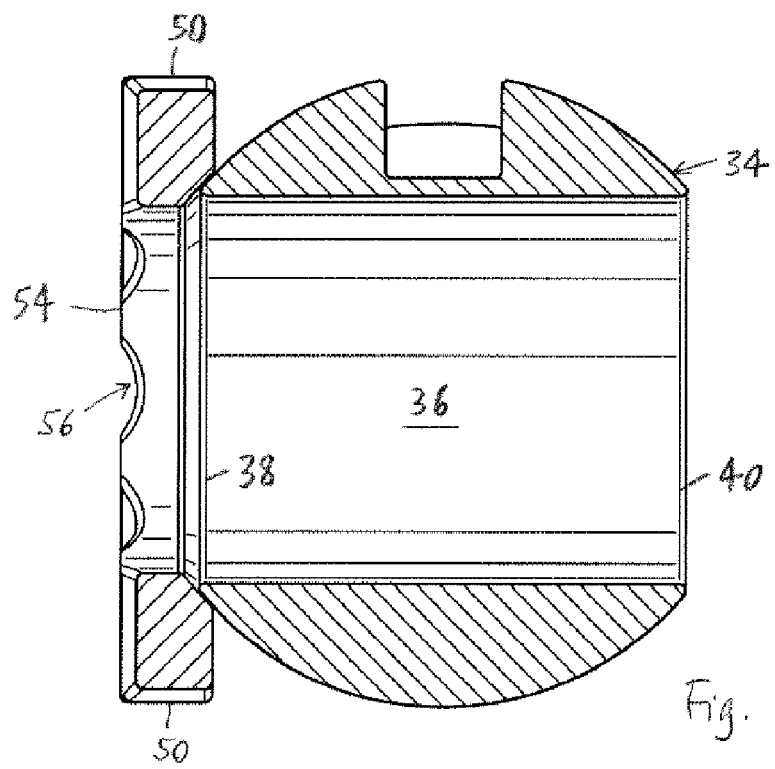
FIG. 4 is a cross-section of the ball and the valve seat of FIG. 3.

Reference is first made to FIGS. 1A-12 to describe an embodiment of a ball valve assembly of the invention generally indicated by the numeral 20. The ball valve assembly 20 is for controlling a flow of a mixture (not shown) through bores 22, 24 in flanges 26, 28 (FIGS. 1A, 1B). As is known in the art, the mixture includes one or more liquids and a number of solid particles. The ball valve assembly 20 includes a body 30 to which the flanges 26, 28 are mountable, as can be seen in FIGS. 1A and 1B. The body 30 preferably includes a cavity 32 therein (FIGS. 1A, 1B), and the assembly 20 also includes a ball 34 positioned in the cavity 32. Preferably, the body 30 also includes one or more engagement surfaces 52 disposed proximal to the cavity 32 (FIGS. 1A-1D). The ball 34 preferably includes a passage 36 therethrough between an inlet end 38 and an outlet end 40 thereof (FIG. 4), and the ball 34 is positionable so that the passage 36 is in fluid communication with the bores 22, 24 when the flanges 26, 28 are mounted to the body 30 (FIG. 1B). The ball valve assembly 20 preferably also includes low-pressure and high-pressure valve seats 42, 44 positioned on opposite sides of the cavity 32 (FIGS. 1A-1D). In one embodiment, the low-pressure and high-pressure valve seats 42, 44 include inner sides 49, 53 respectively adapted for engagement with the ball 34 and outer sides 51, 55 positioned opposite to the inner sides 49, 53 respectively (FIGS. 1C, 1D). As can be seen in FIGS. 1D, 2A and 2B, the high-pressure valve seat 44 also includes an opening 46 therein, and the low-pressure valve seat 42 includes an opening 48 therein as well. In one embodiment, the valve seats 42, 44 are at least partially engagable with the engagement surface(s) 52 of the body 30 (FIGS. 1C, 1D), to locate the low-pressure and the high-pressure valve seats 42, 44 in first and second predetermined positions relative to the ball 34 respectively. The valve seats 42, 44 preferably are positioned to locate the ball 34 therebetween. The ball 34 is movable between an open position (FIGS. 1B, 2A, 2B, and 4), in which the end 38 and the end 40 are at least partially aligned respectively with the openings 48, 46 in the valve seats 42, 44 to permit flow of the mixture in a flow direction from the inlet end 38 to the outlet end 40, and a closed position (FIG. 1A), in which flow of the mixture through the ball 34 is substantially prevented. Preferably, the high-pressure valve seat 44 is adapted to withstand the pressure to which the mixture is subjected when the ball 34 is in the closed position, as will also be described. The low-pressure valve seat 42 also preferably includes one or more scallops 56 formed to permit movement of the mixture past the low-pressure valve seat 42 (FIGS. 2A-6).

It is also preferred that the low-pressure valve seat 42 includes an edge portion 50 (FIG. 9) which is adapted for at least partial engagement with the engagement surface 52 of the body 30 (FIG. 1C). Preferably, the edge portion 50 engages the engagement portion 52 to locate the low-pressure valve seat 42 in the first predetermined position relative to the ball 34 in the cavity 32. The first predetermined position of the low-pressure valve seat 42 and the second predetermined position of the high-pressure valve seat 44 in the body 30 are as shown in FIGS. 1A and 1B. Such positions are determined to be such that the ball 34 is relatively tightly held between the valve seats 42, 44. As can be seen in FIGS. 8-11, in one embodiment, the edge portion 50 preferably is somewhat convex, with a portion 57 which engages the engagement portion 52. It is advantageous to have the edge portion 50 rounded in this way in order to minimize compaction of solid particles between the edge portion 50 and the engagement surface 52 of the body 30 during thermal expansion.

In FIG. 1B, the flow direction is indicated by arrow "A", for the purpose of illustration. It will be understood by those skilled in the art that, when the ball 34 is in the closed position, pressure may be exerted on the ball 34 and the valve seats in the downstream direction or in the upstream direction, depending on the circumstances. For example, as illustrated in FIG. 1A, higher pressure is exerted on the mixture (i.e., and thereby on the high-pressure valve seat 44) when the ball 34 is in the closed position. In FIG. 1A, the general direction of the net pressure to which the mixture is subjected when the valve is closed is indicated by arrow "B", for the purpose of illustration. Because of this, the high-pressure valve seat 44 is on the right-hand side of the ball 34 (as illustrated), and the low-pressure valve seat 42 is on the opposite side of the ball 34.

As will be described, and as shown in FIGS. 1A and 1B, the ball valve assembly 20 preferably includes a biasing means 74 to urge the low-pressure valve seat 42 to press against the ball 34, thereby causing the ball 34 to engage the inner side 53 of the high-pressure valve seat 44 more tightly.

It will be appreciated by those skilled in the art that the direction in which pressure is exerted on the mixture when the ball 34 is in the closed position may be opposite to the flow direction, or substantially the same as the flow direction, depending on the circumstances. Accordingly, regardless of the flow direction, the high-pressure valve seat 44 and the low-pressure valve seat 42 are required to be positioned so that the direction in which the ball 34 is urged by the low-pressure valve seat 42 (and by the biasing means 74) is substantially the same as the direction of the pressure to which the mixture is subjected when the ball 34 is in the closed position. Therefore, the low-pressure valve seat 42 and the high-pressure valve seat 44 are positioned on the respective sides of the cavity 32 which are appropriate in the circumstances.

Figure 9:
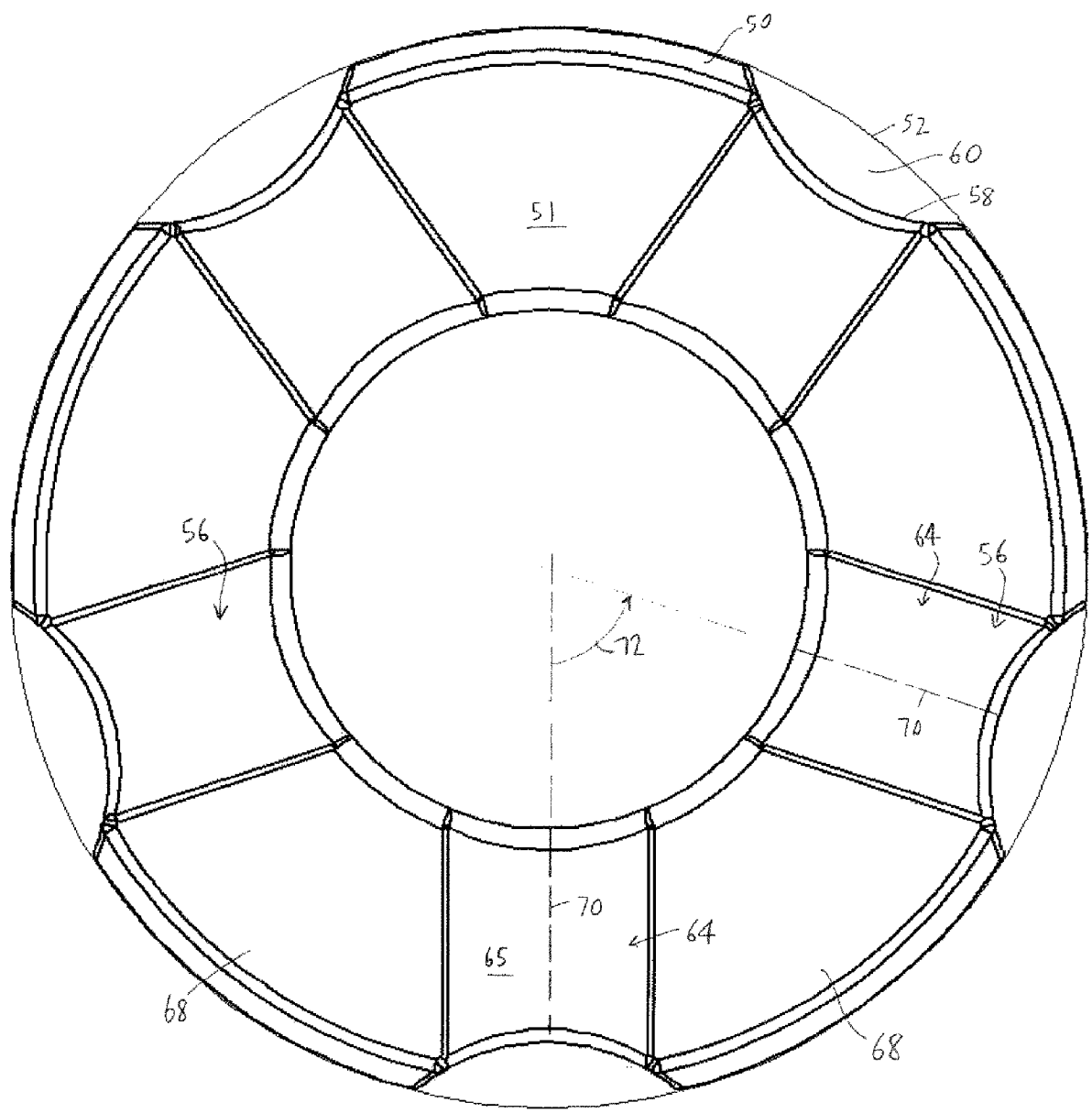
FIG. 9 is a plan view of an outer side of the valve seat of FIG. 8, drawn at a larger scale.

As can be seen in FIG. 9, each scallop 56 preferably includes a first channel wall 58 positioned in the edge portion 50 of the valve seat 42 to define one or more apertures 60 between the engagement surface 52 of the body 30 and the channel wall 58, when the low-pressure valve seat 42 is at least partially engaged with the engagement surface 52, to allow the mixture to flow through the aperture 60 (FIGS. 2A, 2B, and 9). It will be understood that the solid particles may flow past the low-pressure valve seat 42 generally from the inner side to the outer side or vice versa, depending on the flow direction.

For instance, in the circumstances shown in FIG. 1B, the solid particles would move in the mixture generally in the direction of arrow "A" when the mixture is flowing in such direction, as schematically illustrated in FIG. 2B. (The mixture is schematically represented by arrows 71 in FIG. 2B, based on a computational fluid dynamics analysis.) When the valve is closed (FIG. 1A), the pressure to which the mixture (i.e., the mixture in the bore to the left of the low-pressure valve seat 42 and the high-pressure seal 44, as illustrated in FIG. 1A) is subjected increases, but the mixture does not flow.

It will be understood that if, for instance, the flow direction were instead in the direction opposite to that indicated by arrow "A" in FIG. 1B, then the solid particles would be moved past the inner side of the low-pressure valve seat toward the outer side thereof, as schematically illustrated in FIG. 2A.

Figure 10:
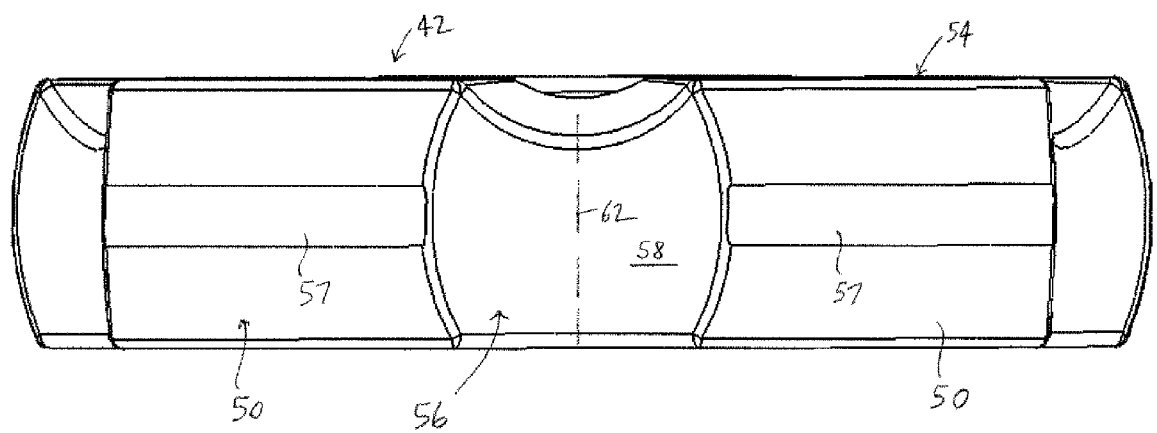
FIG. 10 is a side view of the valve seat of FIG. 8.
Figure 11:
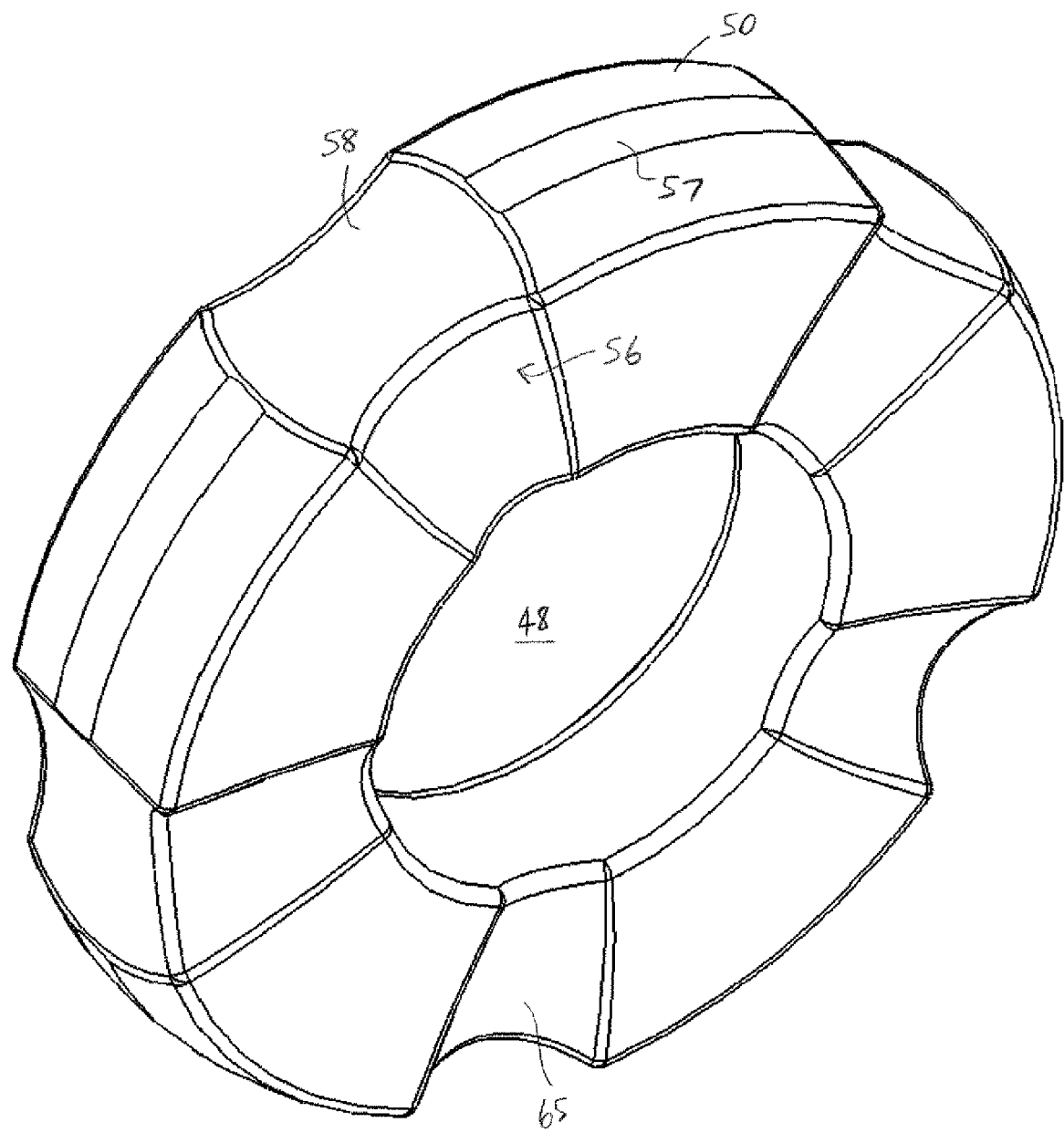
FIG. 11 is an isometric view of the valve seat of FIG. 8, drawn at a smaller scale.
Figure 12:
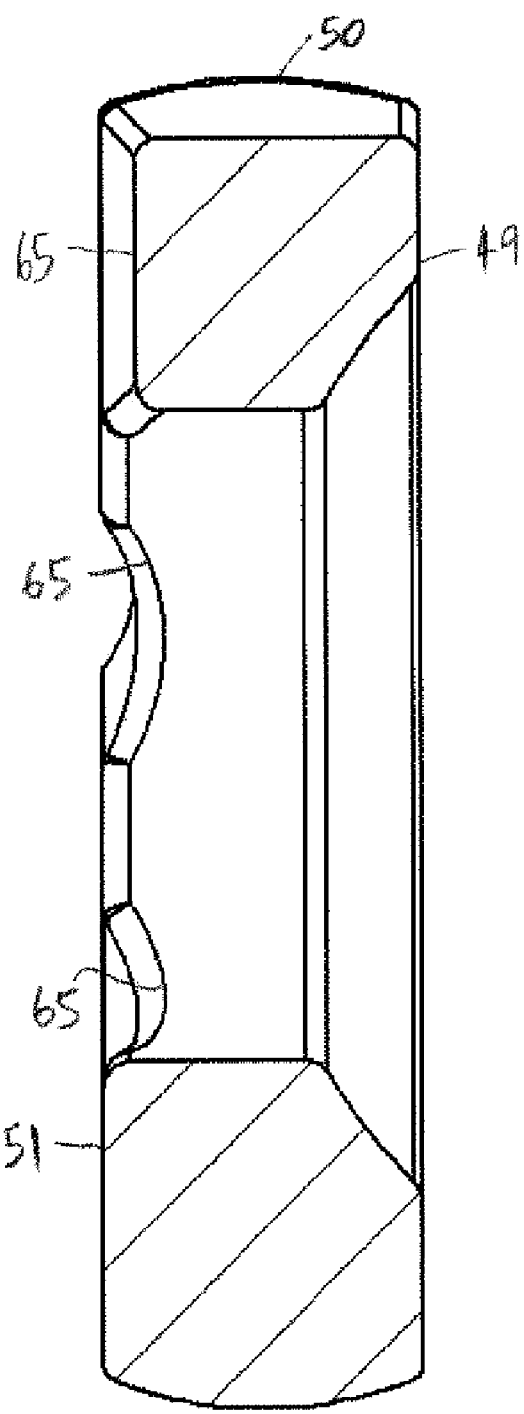
FIG. 12 is a cross-section of the valve seat of FIG. 9 taken along line B-B in FIG. 8.

In one embodiment, the first channel wall 58 is substantially defined by a first longitudinal axis 62 disposed substantially parallel to the flow direction (FIGS. 1B and 10). This provides for minimal obstruction to flow of the mixture through the apertures 60.

It is also preferred that the scallop 56 additionally includes a second channel 64 in the outer side 51, the second channel 64 being at least partially aligned with the aperture 60 (FIG. 9). In one embodiment, and as can be seen in FIG. 9, the outer side 53 includes two or more substantially planar parts 68 positioned on opposite sides of the second channel 64. Preferably, the second channel 64 is at least partially defined by a second longitudinal axis 70 which is disposed substantially orthogonally to the first longitudinal axis 62 (FIG. 9). Specifically, the second channel 64 is defined by a second channel wall 65 (FIGS. 9, 11) which preferably is symmetrical relative to the second longitudinal axis 70.

It is preferred that the low-pressure valve seat 42 includes a plurality of scallops 56, each scallop 56 being radially spaced apart from the scallops proximal thereto by a predetermined angle 72 (FIG. 9). Preferably, the scallops 56 are substantially equally radially spaced apart from each other, as can be seen in FIG. 9.

In one embodiment, the valve seat 42 preferably is urged to engage the ball 34 by the biasing means 74 (FIG. 1C). Any suitable biasing means could be used. However, it is preferred that the biasing means 74 is a Belleville washer. Preferably, the biasing means 74 engages the outer side 51 of the low-pressure valve seat 42. In this way, the low-pressure valve seat 42 is resiliently pressed against the ball 34, thereby assisting holding the ball 34 in its position in the cavity. The resilient character of the biasing means 74 enables dynamic loading of the low-pressure valve seat 42 to take place without substantially affecting the engagement of the low-pressure valve seat 42 with the ball 34, and the engagement of the ball 34 with the inner side of the high-pressure valve seat 44.

As can be seen in FIG. 1C, the biasing means 74 is spaced apart from the second channel wall 65 by a gap 67 (FIG. 1C). As shown in FIG. 1C, due to the configuration of the biasing means 74, the gap 67 varies based on the distance from the opening 48. Because of the gap 67, more space is provided (i.e., between the biasing means 74 and the outer side 51) than is provided in valve assemblies of the prior art between the biasing means and the outer side of the valve seat with which the biasing means is engaged. Accordingly, in the ball valve assembly 20, the solid particles are more likely to pass between the biasing means 74 and the outer surface 51 of the low-pressure value seat 42 than otherwise would be the case, i.e., in the known valve assemblies. Accordingly, due to the second channel 64, the solid particles generally are movable past the outer side 51 without becoming jammed between the outer side 51 and the biasing means 74.

In use, when the ball 34 is in the open position, the mixture flows through the opening 48 in the low-pressure valve seat 42 and also flows over the scallops 56 in the low-pressure valve seat 42, as indicated in FIGS. 2A, 2B. The mixture also flows through the passage in the ball 34, and in the circumstances shown in FIG. 2A, the mixture exits the valve 20 at the opening 46 in the high-pressure valve seat 44. As schematically illustrated in FIGS. 2A and 2B, the mixture moves through the apertures 60 between the engagement surface (not shown in FIGS. 2A and 2B) of the body 30 and the first channel wall 58 in the edge portion 50 of the low-pressure valve seat 42.

It will be understood that the "open position" as defined herein refers to any position in which the mixture is permitted to flow through the ball. In practice, the ball may be considered "open" when it is in a variety of positions, i.e., in each which position flow of the mixture through the passage is permitted.

When the ball is in the closed position (FIG. 1A), depending on the circumstances, pressure tends to build on one side of the valve, and the mixture on such side of the valve is subjected to the pressure. For example, as can be seen in FIG. 1A, when the ball 34 is in the closed position, pressure is exerted on the high-pressure valve seat 44 in the direction indicated by arrow "B".

As noted above, the pressure which is usually exerted on the mixture (and therefore transmitted to the high-pressure valve seat 44) when the valve is closed may or may not be exerted in the same direction as the direction of flow, depending on the circumstances in which the valve assembly 20 is used. In the exemplary embodiment shown in FIGS. 1A and 1B, for example, the flow direction (indicated by arrow "A" in FIG. 1B) is the same as the direction of pressure (indicated by arrow "B" in FIG. 1A).

Figure 6:
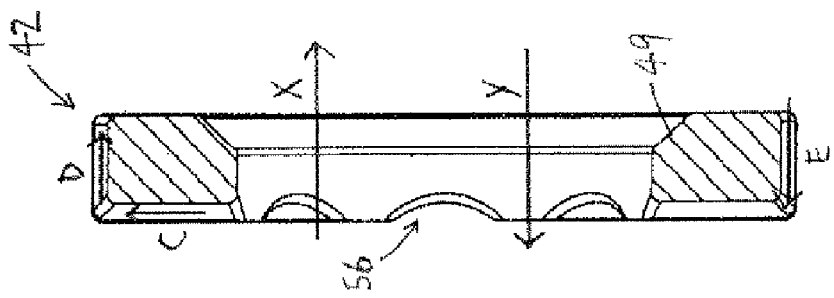
FIG. 6 is a cross-section of the valve seat of FIG. 5, taken along line A-A in FIG. 5.
Figure 5:
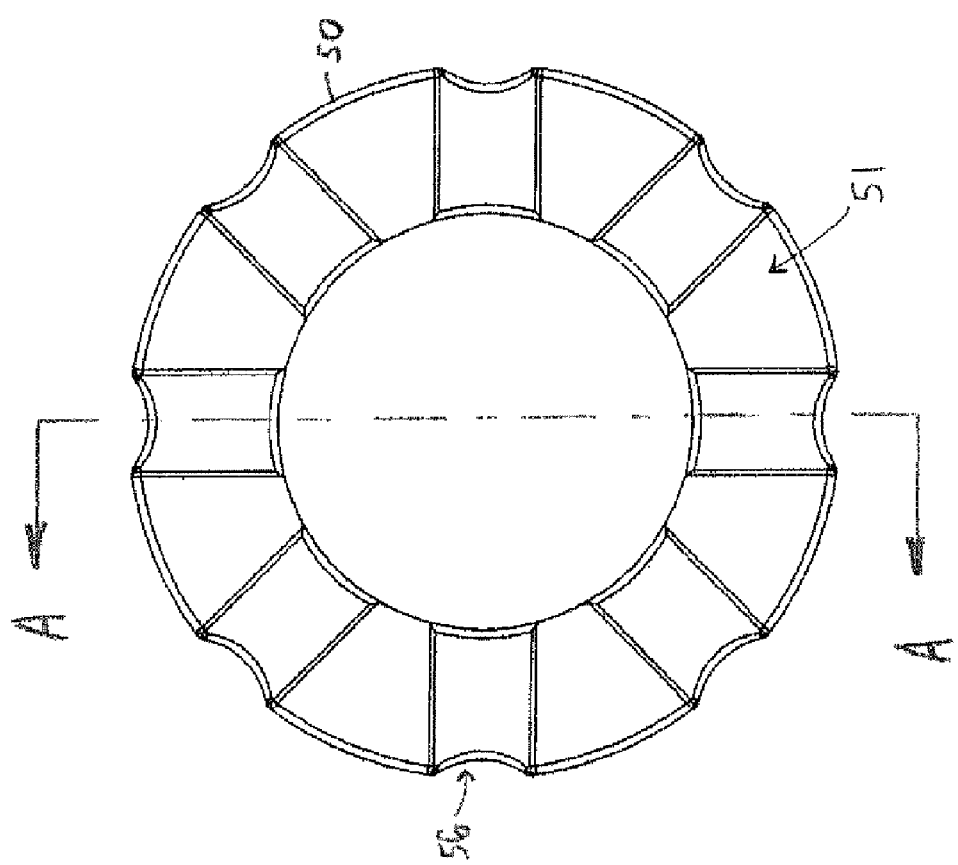
FIG. 5 is a plan view of an outer side of an embodiment of the low-pressure valve seat of the invention, drawn at a smaller scale.
Figure 7:
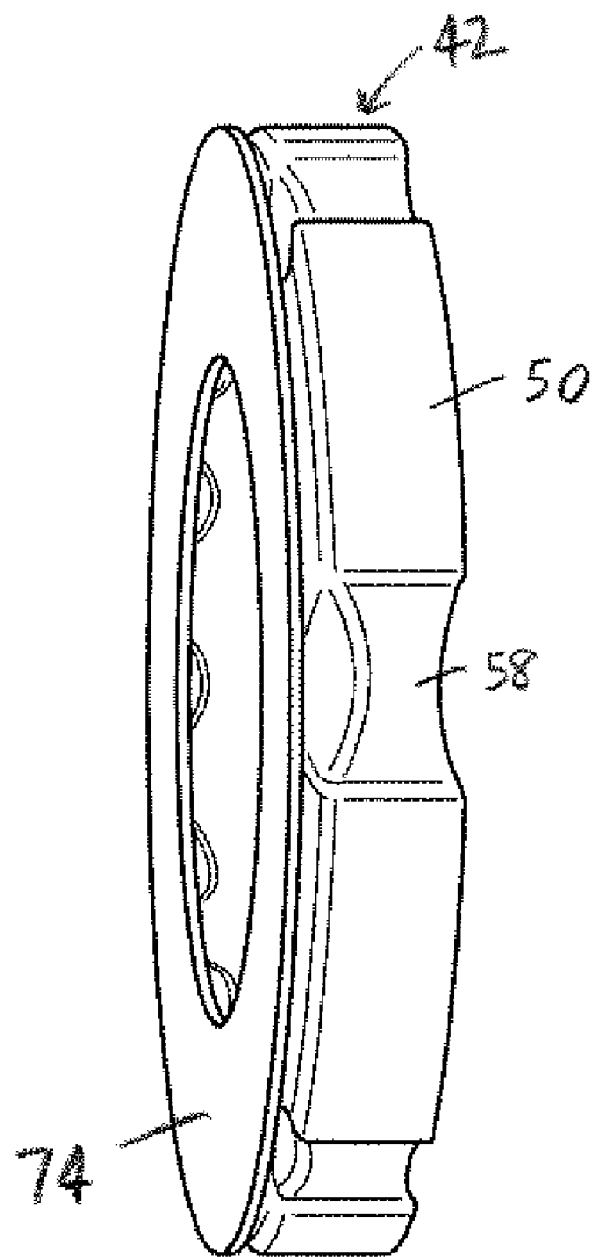
FIG. 7 is an isometric view of an embodiment of a low-pressure valve seat of the invention, showing an outer side thereof engaged by a biasing means.
Figure 8:
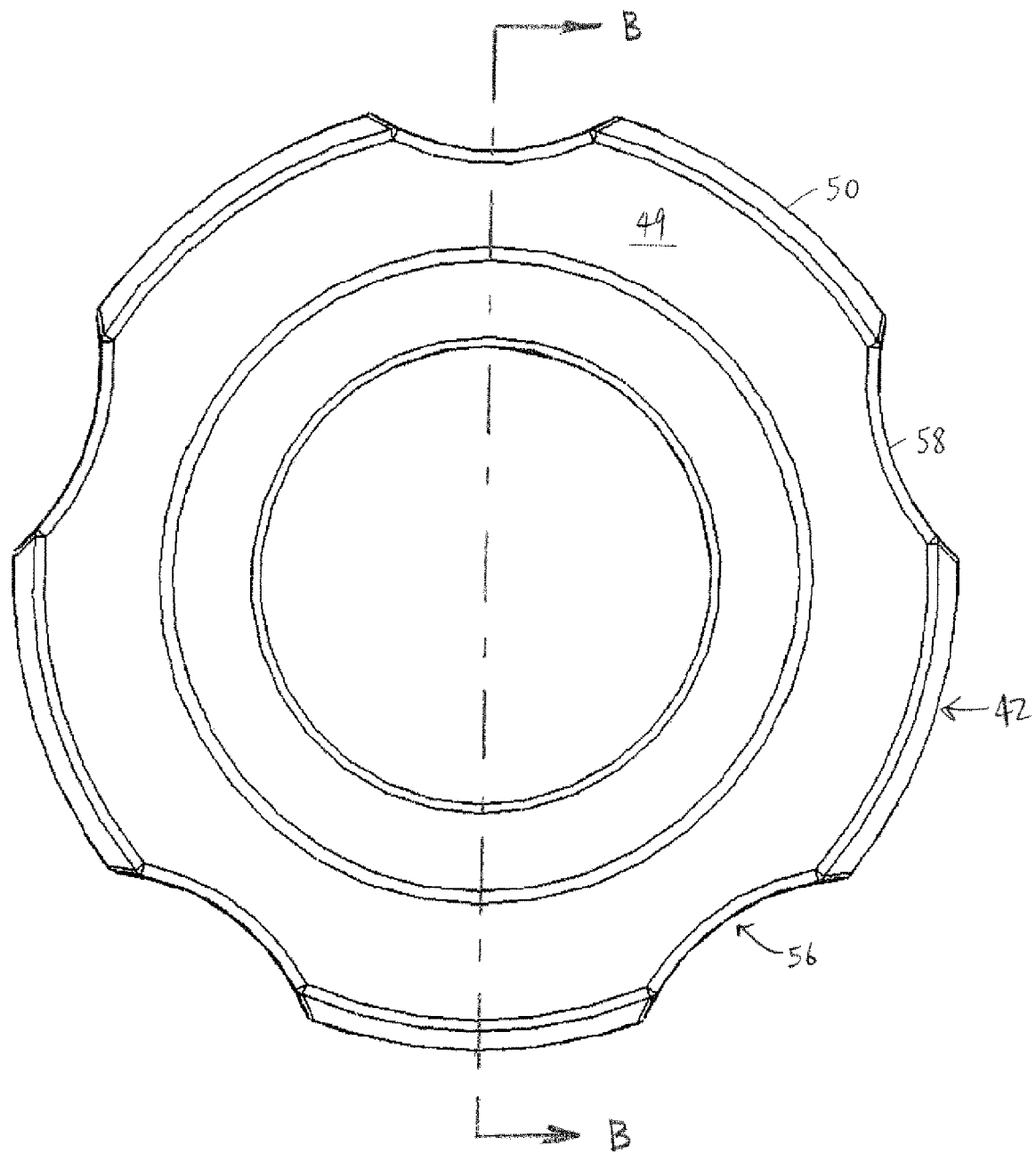
FIG. 8 is a plan view of an embodiment of the low-pressure valve seat of the invention showing an inner side thereof adapted for engagement with the ball, drawn at a larger scale.

As can be seen in FIGS. 5 and 6, the second channel portion 64 of each scallop 56 preferably is positioned substantially orthogonal relative to the flow direction. As shown in FIG. 6, and as described above, the flow direction may be in the direction indicated by arrow "X", or alternatively, the flow direction may be in the direction indicated by arrow "Y".

The portion of the mixture which is directed along the second channel 64 when the mixture is generally flowing in the direction indicated by arrow "X" is represented schematically by the arrow "C" in FIG. 6. Also, the portion of the mixture which is directed through the aperture 60 when the mixture is generally flowing in the direction indicated by arrow "X" is represented schematically by arrow "D" in FIG. 6.

Similarly, the portion of the mixture which is directed through the aperture 60 when the mixture is generally flowing in the direction indicated by arrow "Y" is represented schematically by arrow "E" in FIG. 6.

Figure 13:
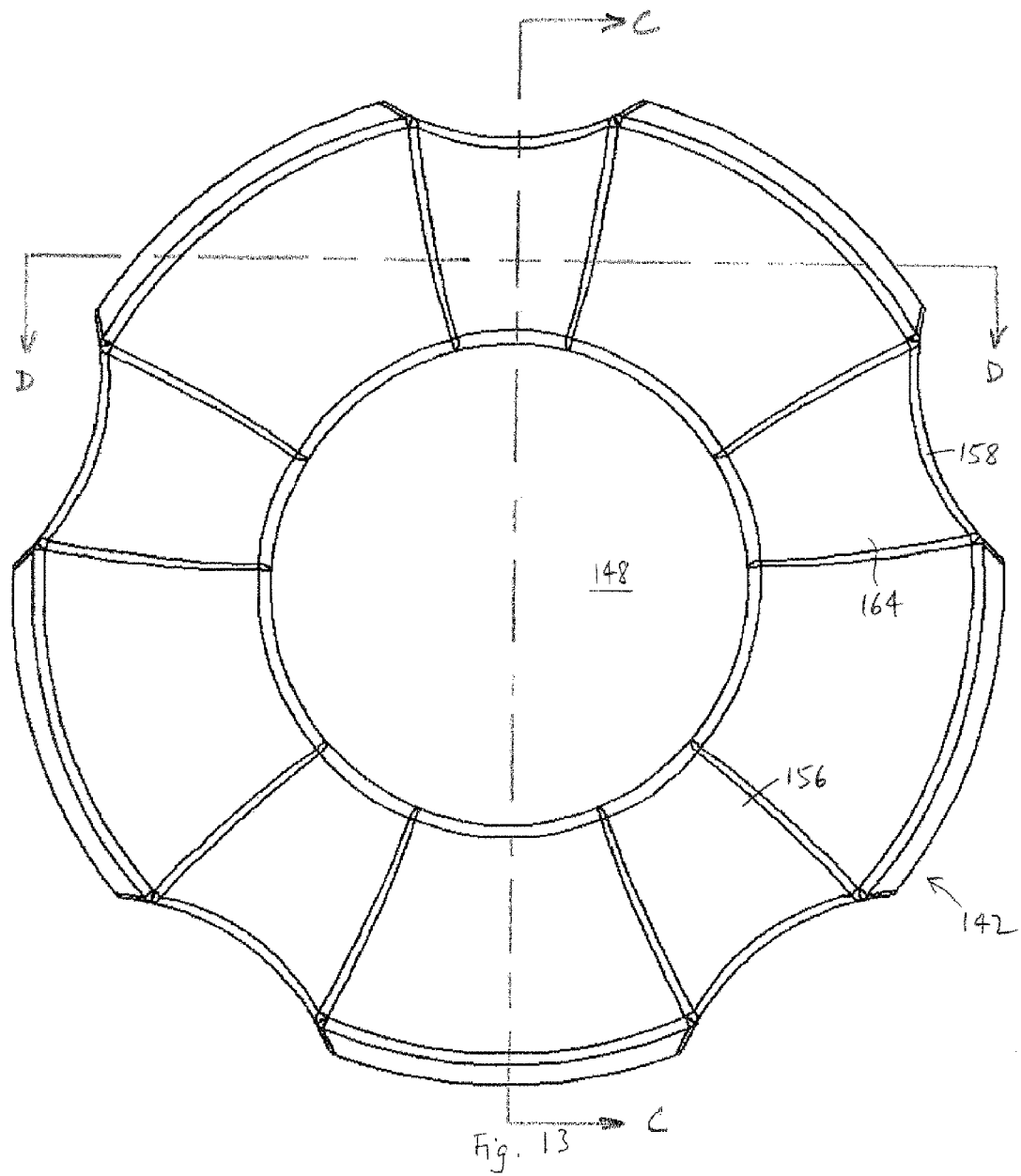
FIG. 13 is a plan view of an outer side of another embodiment of the low-pressure valve seat of the invention, drawn at a larger scale.
Figure 14:
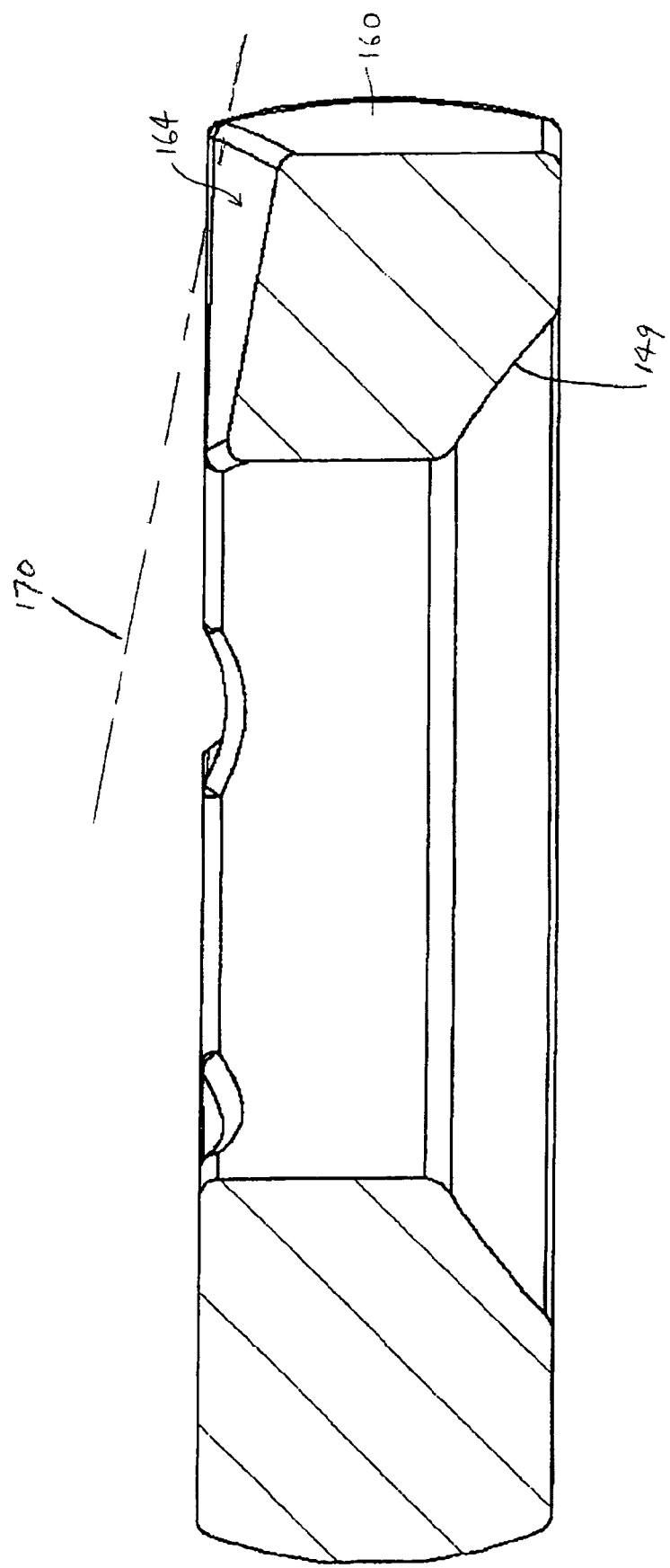
FIG. 14 is a cross-section of the upstream valve seat of FIG. 13, taken along line C-C in FIG. 13, drawn at a larger scale.
Figure 15:
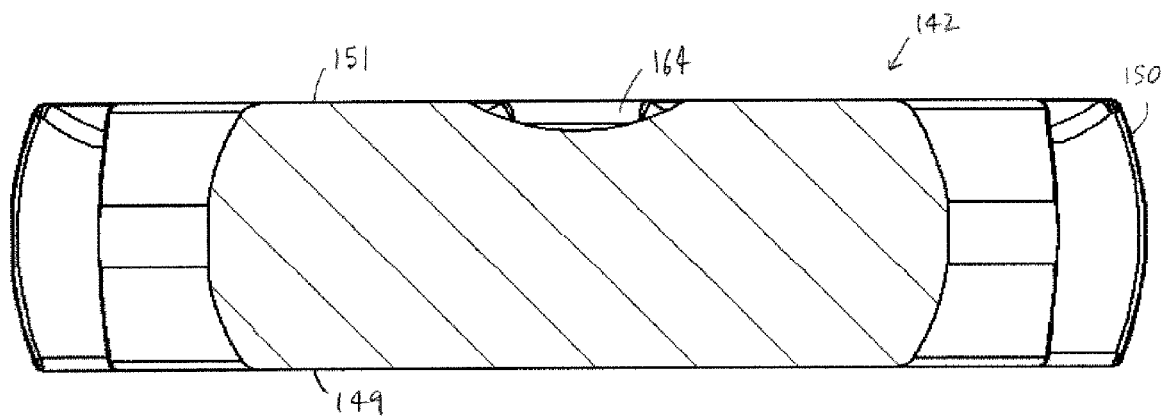
FIG. 15 is a cross-section of the upstream valve seat of FIG. 13, taken along line D-D in FIG. 13.

An additional embodiment of the low-pressure valve seat of the invention is disclosed in FIGS. 13-15. In FIGS. 13-15, elements are numbered so as to correspond to like elements shown in FIGS. 1A-12.

In an alternative embodiment of the low-pressure valve seat 142 of the invention, a second channel 164 preferably is at least partially defined by a longitudinal axis 170 which is in a substantially non-orthogonal relationship relative to a first longitudinal axis 162. As can be seen in FIG. 14, because of the second channel's generally non-orthogonal position relative to the flow direction, the portion of the mixture which is directed by the second channel 164 toward the aperture 160 is urged toward the aperture 160 (i.e., away from the opening 148).

Any element in a claim that does not explicitly state "means for" performing a specific function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A ball valve assembly for controlling flow of a mixture through bores in two flanges, the mixture comprising at least one fluid and a plurality of solid particles, the ball valve assembly comprising:
    a body to which said flanges are mountable, the body comprising a cavity therein and at least one engagement surface proximal to the cavity;
    a ball positioned in the cavity and comprising a passage therethrough between an inlet end and an outlet end thereof, the passage being positionable to be in fluid communication with the bores when the flanges are mounted to the body;
    a low-pressure valve seat comprising an opening therein, the low-pressure valve seat additionally comprising an inner side adapted for engagement with the ball and an outer side positioned opposite to the inner side, the low-pressure valve seat being at least partially engageable with said at least one engagement surface to locate the low-pressure valve seat in a first predetermined position relative to the ball;
    a high-pressure valve seat comprising an opening therein, the high-pressure valve seat additionally comprising an inner side adapted for engagement with the ball and an outer side positioned opposite to the inner side, the high-pressure valve seat being at least partially engageable with said at least one engagement surface to locate the high-pressure valve seat in a second predetermined position relative to the ball;
    the valve seats being positioned for locating the ball therebetween, the ball being movable between an open position, in which each of the inlet and the outlet ends is at least partially aligned with one of the openings in the low-pressure and high-pressure valve seats respectively to permit flow of the mixture in a flow direction from the inlet end to the outlet end, and a closed position, in which flow of the mixture through the ball is substantially prevented;
    the high-pressure valve seat being adapted to withstand pressure to which the mixture is subjected when the ball is in the closed position;
    the low-pressure valve seat comprising at least one scallop formed to permit movement of at least a portion of the mixture past the low-pressure valve seat when the ball is in the open position;
    the low-pressure valve seat comprising an edge portion adapted for at least partial engagement with said at least one engagement surface of the body, for locating the low-pressure valve seat in the first predetermined position;
    said at least one scallop comprising a first channel wall positioned in the edge portion of the low-pressure valve seat to define at least one aperture between the first channel wall and the engagement surface, said at least one aperture being adapted to permit movement of the particles therethrough; and
    said at least one scallop additionally comprising a second channel in the outer side of the low-pressure valve seat, the second channel being at least partially aligned with said at least one aperture.

2. A ball valve assembly according to claim 1 in which the outer side of the low-pressure valve seat comprises at least two substantially planar parts positioned on opposite sides of the second channel.

3. A ball valve assembly according to claim 1 in which the second channel is at least partially defined by a second longitudinal axis thereof disposed substantially orthogonal to the first longitudinal axis.

4. A ball valve assembly according to claim 1 in which the low-pressure valve seat comprises a plurality of scallops, each said scallop being radially spaced apart from said scallops proximal thereto by a predetermined angle.

5. A ball valve assembly according to claim 4 in which the scallops are substantially equally radially spaced apart from each other.

6. A ball valve assembly according to claim 1 in which the second channel is at least partially defined by a longitudinal axis thereof which is in a substantially non-orthogonal position relative to the first longitudinal axis.

7. A ball valve assembly according to claim 1 additionally comprising a biasing means for urging the low-pressure valve seat to engage the ball.

8. A low-pressure valve seat for use in a ball valve assembly for controlling a flow of a mixture through bores in two flanges, the mixture comprising at least one fluid and a plurality of solid particles, the valve assembly comprising a body with a cavity therein, the valve seat comprising:

an inner side engageable with a ball positioned in the cavity, the ball comprising a passage therethrough between an inlet end and an outlet end thereof;

an outer side positioned opposite to the inner side;

an opening with which the passage in the ball is at least partially alignable to permit flow of the mixture through the opening;

an edge portion adapted for at least partial engagement thereof with at least one engagement surface of the body, to locate the low-pressure valve seat in a predetermined position relative to the cavity;

the ball being movable between an open position, in which the passage is in fluid communication with the bores when the flanges are mounted to the body and the mixture is flowable through the passage in a flow direction, and a closed position, in which flow of the mixture through the passage is substantially prevented;

the low-pressure valve seat comprising at least one scallop formed to permit movement of the solid particles past the low-pressure valve seat when the mixture is flowing through the ball;

said at least one scallop comprising a first channel wall positioned in the edge portion to define at least one aperture between the first channel wall and said at least one engagement surface, said at least one aperture being adapted to permit movement of the mixture therethrough;

the first channel wall being at least partially defined by a first longitudinal axis disposed substantially parallel to the flow direction; and said at least one scallop additionally comprising a second channel in the outer side, the second channel being at least partially aligned with the first channel wall.

9. A low-pressure valve seat according to claim 8 in which the outer side comprises at least two substantially planar parts positioned proximal to the second channel.

10. A low-pressure valve seat according to claim 9 in which the second channel is at least partially defined by a second longitudinal axis thereof disposed substantially orthogonal to the first longitudinal axis.

11. A low-pressure valve seat according to claim 9 in which the second channel is at least partially defined by a second longitudinal axis thereof which is in a substantially non-orthogonal position relative to the first longitudinal axis.

12. A low-pressure valve seat according to claim 8 comprising a plurality of scallops, each said scallop being radially spaced apart from said scallops proximal thereto by a predetermined angle.

13. A low-pressure valve seat according to claim 12 in which the scallops are substantially equally radially spaced apart from each other.

* * * * *